United States Patent [19]

Driskill

[11] 4,134,714

[45] Jan. 16, 1979

[54] MULTI-STAGE CONTINUOUS PLASTIC EXTRUSION APPARATUS, AND EXTRUSION SCREW

[75] Inventor: Roger D. Driskill, Seymour, Conn.

[73] Assignee: General Electric Company, New York, N.Y.

[21] Appl. No.: 788,252

[22] Filed: Apr. 18, 1977

[51] Int. Cl.$^2$ .......................... B29F 3/03; B29F 3/06; B29F 3/10
[52] U.S. Cl. .................................. 425/113; 366/83; 366/91; 425/203; 425/205; 425/208; 425/215; 425/376 R
[58] Field of Search ............... 425/205, 215, 216, 217, 425/376 R, 208, 113, 207, 209, 203; 198/669; 259/191, 192, 193; 100/146; 264/174, 176 R; 366/88, 83, 91

[56] References Cited

U.S. PATENT DOCUMENTS

| | | | |
|---|---|---|---|
| 3,409,940 | 11/1968 | Ovtcharenko | 425/205 X |
| 3,632,256 | 1/1972 | Kasting et al. | 425/205 |
| 3,979,488 | 9/1976 | Greenhalgh et al. | 425/113 X |
| 4,063,718 | 12/1977 | Koch | 366/88 X |

FOREIGN PATENT DOCUMENTS 7514238  6/1976  Netherlands .............................. 425/205

*Primary Examiner*—Richard B. Lazarus
*Assistant Examiner*—Mark Rosenbaum
*Attorney, Agent, or Firm*—R. G. Simkins; P. L. Schlamp

[57] ABSTRACT

A multi-stage extruder apparatus comprising at least two extruder units operatively joined together in series for the progressive sequential working of plastic molding material moving continuously therethrough. The apparatus comprises an improved extrusion screw for a succeeding extruder unit of the multi-stage apparatus which prevents adverse effects attributable to an imbalance of the rate or volume of molding material moving continuously through the multi-stage apparatus.

7 Claims, 1 Drawing Figure

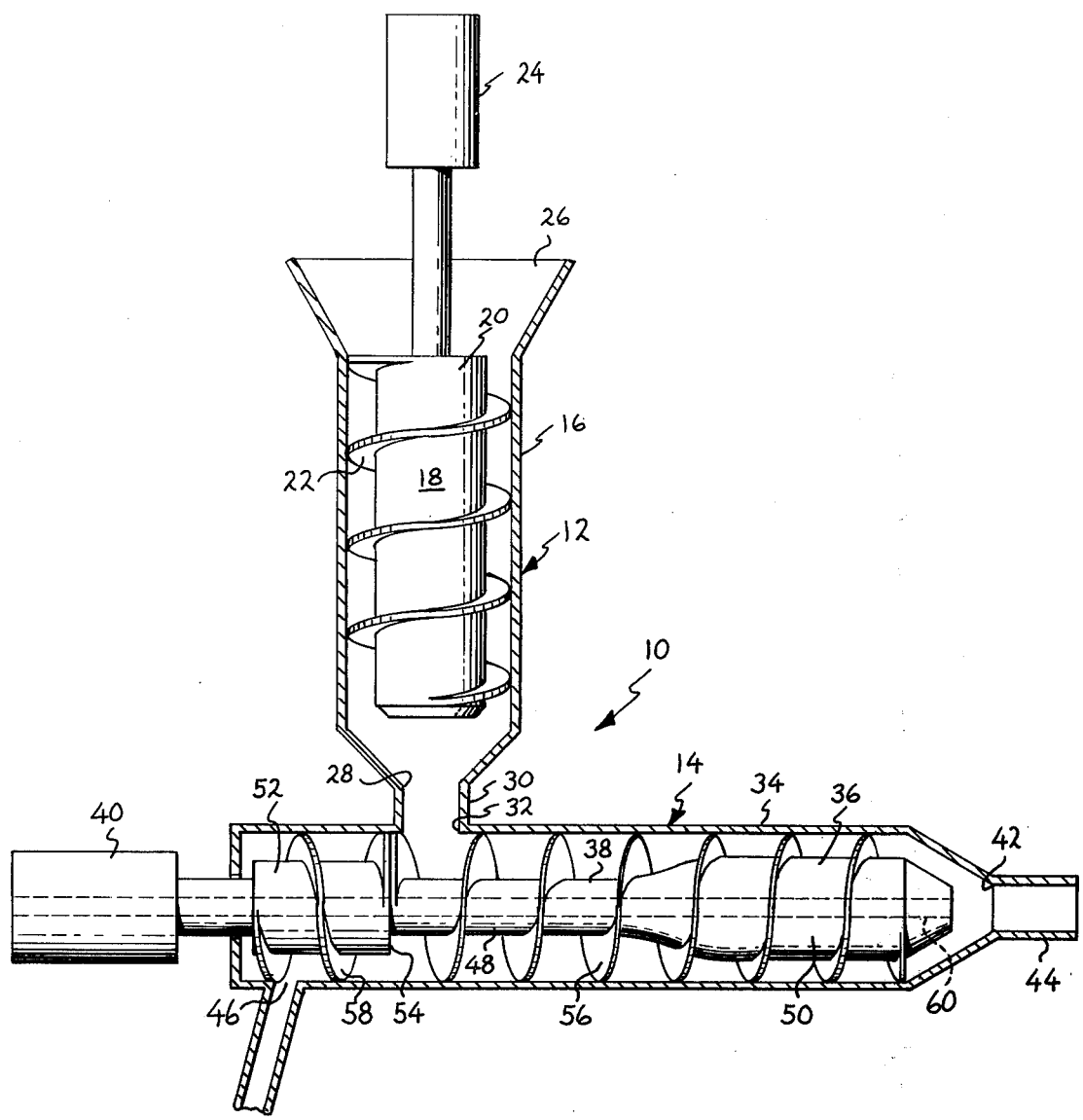

MULTI-STAGE CONTINUOUS PLASTIC EXTRUSION APPARATUS, AND EXTRUSION SCREW

BACKGROUND OF THE INVENTION

Multi-stage plastic extrusion apparatus, comprising essentially two or more extruder units operatively connected in series, provide great latitude and flexibility in operation and performance due to their capability of sequentially imposing markedly different plastic working conditions, such as different screw rotation speeds, in each unit of the composite apparatus independent of the others. Examples of such multi-stage plastic extrusion apparatus and their operation and versatility are provided by the prior art U.S. Pat. Nos. 2,836,851; 3,148,231; 3,261,056; 3,274,647; 3,409,940; 3,467,743; 3,470,534; and 3,979,488.

As is known in the plastic forming art, and as is apparent from the above cited prior art patents relating to multi-stage plastic extruding apparatus, this type of continuous plastic processing and/or continuous plastic shaping device comprises a plurality of at least two essentially individual extruder units arranged in series with respect to each other, with each unit having a separate housing or barrel containing therein a screw which is rotated independently, at least as to speed, from the screw of the other unit or units.

Commonly the extruder screw in each unit of a multi-stage extruder apparatus, is of a different dimension and/or configuration, as well as being designed to operate a distinctive speed, in order for each unit or the screw thereof to uniquely perform a particular or primary function with optimum effectiveness.

Among the various attributes of typical multi-stage extruding apparatus is that the mechanical system thereof is especially amenable to the provision therein of effective venting means whereby gases such as entrained air, water vapor or steam, and formed volatiles, released from the molding compound or plastic stock material being heated and worked therein, can be aptly expelled from the apparatus and its contents. Frequently, such gas venting means for a multi-stage extruding apparatus comprise a simple vent port or opening in the second, or possibly third, stage extruder housing or barrel located upstream from the generally intermediate positioned feed inlet or entry in the housing or barrel for the introduction therein of molding compound or stock. Such conventional gas evacuating vents are illustrated in U.S. Pat. Nos. 2,836,851; 3,467,743; and 3,979,488, cited above. However, highly complex venting systems and means are contrived for some processes or purposes, such as shown in above cited U.S. Pat. No. 3,470,584.

Multi-stage extruders, nevertheless, are subject to certain shortcomings peculiar to their distinctive construction or mechanical system, and modes of operation.

One significant disadvantage of multi-stage extruding apparatus primarily attributable to the distinctive structural designs and independent drive for the separate extrusion screws of such continuous plastic working apparatus, is the difficulty, if not the substantial impossibility, of equalizing or balancing the flow rate or volume of the plastic molding compound or stock material advancing through each unit, one after another, in series, propelled therethrough by their respective screws. This problem or difficulty of equalizing or balancing rates or volume of compound or material flow or movement through each unit in series is frequently compounded because temperatures effect flow properties or rates of such materials, and different or changing temperatures are commonly encountered within the system components due to their specialized role and the different levels of plastic working effected therein.

In some instances multi-stage extruding apparatus, or their sequential flow rates, can be adjusted by means of trial and error measures made during operation so as to approach or achieve a substantial degree of balanced or equalized flow therethrough, or they can be programmed whereby each succeeding unit is set to progressively exceed the flow rate therethrough of the immediately preceding unit to thereby preclude a "bottleneck" effect or the backing up of material within the system. However, an initial imbalance in flow is substantially unavoidable upon starting operation and during the early stages of running, and such an imbalance will usually continue until an equilibrium of conditions, such as temperatures and the like, is reached. Also, programming the system for progressively greater flow rates in each succeeding unit, retards production capacity and, contrary to designed operating conditions, ultimately diminishes the amount of compound or stock within the system or preceding sections thereof whereby its performance with regard to mixing and plasticizing is impeded or diminished.

An imbalance of flow occurring at any time during operation of the system wherein molding compound or stock is advanced from a preceding unit into a succeeding unit at a faster rate or volume than the subsequent unit is moving such compound or stock therethrough, results in a high back pressure which is converse to the designed mode and conditions of operation. In a typical multi-stage extrusion apparatus, such as those described in the cited prior art patents, and particularly those systems having a gas evacuating vent in a succeeding unit located upstream from a generally intermediate feed inlet as shown in the prior art, the back pressure due to such a flow imbalance, forces molding compound or stock to move in a counterflow direction within the succeeding unit upstream from the generally intermediate inlet or feed entry and into an otherwise unoccupied static area comprising the section of the unit provided for the degassing function. This upstream counterflow movement imposed by the back pressure attributable to such a flow imbalance, therefore thrusts the plastic molding compound or stock beyond the designed and normal flow pattern or path and motivating force of a constantly moving stream of the body of the molding compound or stock propelled along by the screw within the unit and advancing therethrough from the inlet to the outlet.

Once molding compound or stock has been driven counter-current upstream beyond the inlet, entering into the unoccupied degassing area, and thereby departing from the established path or current of flow or movement for material advancing therethrough, the displaced molding compound or stock is very likely to remain for an indeterminate period of time within the static environment of the empty area beyond the moving current or stock of material. For instance, the molding compound or stock in a plasticized or semi-plasticized condition due to heat is frequently sufficiently tacky to adhere to portions of the apparatus located in the upstream static area beyond the influence of the motivating current or force of the constantly moving stream of the molding compound or stock propelled by the screw along the designed flow path from the inlet to the outlet.

A prolonged or unequal retention of many plastic molding compounds or stock materials, especially within the relatively hot confines of an extruder unit, is very likely to have adverse effects upon their physical and/or chemical properties. For example, many plastic molding compounds or stock materials include added heat activatable curing agents or contain polymeric ingredients which, although initially heat softenable or "thermoplastic", are inherently "thermosetting" or curable upon heating to a substantially infusible and intractable condition. Such molding compounds or stock materials must be expeditiously and uniformly handled or processed insofar as mixing and heating to plasticize and blend them immediately preparatory to shaping or molding, or they are subject to "scorching" or precuring which occurrence diminishes or destroys their subsequent plasticity and tractability or capability of plastic flow and compliance to shaping.

Thus, a prolonged retention of any plastic molding compound or stock material within an extruder unit, such as the result of its temporary displacement beyond the constantly moving stream of the compound or stock advancing therethrough into a static area, may detract from or inhibit its subsequent dispersion and integration or blending within the main body of molding compound or stock upon its return thereto because of its longer heat history or attainment of an advanced degree of cure. For instance, particles or bodies of molding compound or stock which have been transformed to an advanced state of cure by whatever mechanism or cause, thereafter substantially maintaining their discrete physical identity, resisting integration and uniform fusing and dispersion or blending with more plastic and tractable molding compound or stock whereby the less tractable particles or bodies thereof are thereafter transported essentially intact through the extruder system or operation along with the overall mass of advancing molding compound or stock. The presence of such discrete and indissoluble or intractable particles or bodies passing through the apparatus carried along within the mass of the molding compound or stock, disrupts the uniform or smooth continuous flow thereof through the die means or other shape imposing continuous molding device, and thereby causes imperfections and/or discontinuities within the product molded therefrom as well as a lack of physical homogeneity therein. Such imperfections or discontinuities, or want of homogeneity may significantly detract from a molded products physical attributes or integrity.

Moreover, this deficiency common to multi-stage extrusion apparatus presents a particularly nettlesome problem in the production of plastic insulation coated electrical conductors or wires which are frequently manufactured with such continuous extrusion molding means. Namely, aside from detracting from appearances and physical attributes, such irregularities in insulating coating or coverings on electrical conductors or wires create sites which are more prone to electrical deficiency or breakdown, thereby precluding the product from meeting standards or diminishing its subsequent service life.

SUMMARY OF THE INVENTION

This invention comprises a novel and improved apparatus including a new and improved extruder screw, or construction therefor, for a succeeding unit of a multi-stage extrusion apparatus. The new extruder screw incorporates structural means for preventing the reintroduction of any retarded or displaced plastic molding compound or stock material which may have acquired a different heat history or level of cure into the continuously moving main body or stream of plastic molding compound or stock material advancing through the system or apparatus, and thereby precludes the possibility of contamination therewith.

OBJECTS OF THE INVENTION

It is a primary object of this invention to provide an improved multi-stage plastic extrusion apparatus for the continuous blending and plasticizing of heat softenable molding compound or stock material.

It is also an object of this invention to provide a novel extrusion screw for a succeeding unit of a multi-stage plastic extrusion apparatus for the continuous blending and plasticizing of heat softenable molding compound or stock material.

It is another object of this invention to provide an improved multi-stage plastic extrusion apparatus having a novel extrusion screw in a succeeding extrusion unit thereof for the continuous blending and plasticizing of heat softenable molding compound or stock material, which precludes the return or reintroduction of any deviated or retarded molding compound or stock material into the main stream or body of plastic molding compound or stock material continuously advancing through the succeeding extrusion unit of the apparatus in its designed patterns.

It is a futher object of this invention to provide an improved multi-stage plastic extrusion apparatus for the continuous blending and plasticizing of heat curable plastic electrical insulating compounds and the continuous molding of the same as an insulating covering or coating around elongated electrical conductors or wires.

BRIEF DESCRIPTION OF THE DRAWING

The drawing comprises a sectional view with parts in elevation of a multi-stage extrusion apparatus embodiment of this invention, illustrating the improved screw of the succeeding extrusion unit.

DETAILED DESCRIPTION OF A PREFERRED EMBODIMENT

In accordance with the present invention, a multi-stage plastic extrusion apparatus is provided which continuously produces a uniformly plasticized and blended, homogeneous plastic molding compound or stock material, and/or continuously molds such compounds or stock into smooth and uniform products free of imperfections or discontinuities therein. The invention comprises a novel extrusion screw and an improved multi-stage plastic extrusion apparatus for continuous processing and/or molding, incorporating said novel screw in a succeeding unit, such as second or third stage, of said multi-stage extrusion apparatus.

Referring to the drawing, the multi-stage extruder 10 illustrated comprises a two stage, continuous plastic extrusion apparatus, comprising a preceding or first extruder unit 12 and a succeeding or second extruder unit 14, operatively connected in series. However, although a preferred embodiment of the invention, which is hereinafter described in detail, comprises a two stage extrusion device, it should be understood that this invention also applies to and includes multi-stage extruders of three or more extruder units in series, such as illustrated in U.S. Pat. No. 3,261,056, wherein the novel extruder screw construction of the invention can be utilized in one or more of the succeeding extruder units of the multi-stage extruder apparatus, for example, in the second unit and/or in the third unit, et seq.

The preceding extruder unit 12, or first unit of the embodiment illustrated, of the multi-stage extruder apparatus 10, of the invention, comprises a housing or barrel 16 typically composed of a cylindrical chamber, and containing therein an extrusion screw 18 positioned in the barrel 16 and extending substantially therethrough. Extrusion screw 18 includes a shaft 20 provided with one or more helical ribs 22 extending thereabout along substantially the length thereof for the advancement of molding compound or stock through the unit. The screw 18 is rotated by any apt means, such as an electric or hydraulic motor, illustrated as 24. Plastic molding compound or stock material (not shown) can be introduced or fed into the preceding or first extruder unit 12 by any suitable or conventional means such as feed inlet or entry 26, located in an upstream position or end thereof, and the said extruder unit 12 is provided with an outlet 28 located in its downstream end for the discharge of molding compound or stock therefrom.

The extrusion screw 18 extends substantially through the barrel 16 from the inlet 26 to the outlet 28, as illustrated.

A connection comprising a passage 30 leads from the outlet 28 of the preceding extruder unit 12 to a feed entry or inlet 32 in the succeeding or second extruder unit 14, for the transfer of plastic molding compound or stock material from the outlet 28 of the preceding unit 12 to the inlet 32 of the succeeding unit 14.

The succeeding extruder unit 14, or second unit of this embodiment, of the multi-stage extruder apparatus 10, of the invention, comprises a housing or barrel 34 typically comprising a cylindrical chamber, and containing therein an extruder screw 36 positioned in the barrel 34 and extending from beyond the upstream end of the barrel and continuing substantially therethrough. Extrusion screw 36 includes an elongated shaft 38 which is rotated by any apt means, such as an electric or hydraulic motor, illustrated as 40.

Housing or barrel 34 of the succeeding extruder unit 14 is provided with a feed inlet or entry 32 located generally intermediate the length thereof and an outlet 42 located in its downstream end for the discharge of molding compound or stock therefrom. Outlet 42 may be connected with a shape imparting die member or mold 44 for the continuous shaping or molding of plastic compound or stock passing therethrough. Barrel 34 is also provided with a gas venting port and surplus discharge outlet 46, located upstream from the generally intermediate inlet 32 and adjacent the upstream end of barrel 34.

Extruder screw 36 of the succeeding unit 14, is provided with a portion 48 of its elongated shaft 38 having a substantially reduced cross-section or diameter at a generally intermediate location thereof which is positioned adjacent to the inlet 32 located generally intermediate the barrel 34, and said reduced intermediate portion 48 extends in a downstream direction from the location of the inlet 32. The elongated shaft 38 of screw 36 is also provided with a downstream portion 50 thereof having a relatively enlarged cross-section or diameter located downstream from the reduced intermediate portion 48 and generally adjacent to the outlet 42 of the barrel 34.

Directly upstream from the location of the intermediate inlet 32 in barrel 34 of the succeeding unit 14, the elongated shaft 38 of screw 36 is provided with a portion 52 of a greatly enlarged cross-section or diameter. The reduced cross-section intermediate portion 48 of the shaft 38 adjacent to the inlet 32, and the greatly enlarged cross-section upstream portion 52 of the shaft 38 form a generally radial extending shoulder or annular lateral projection 54, as illustrated in the drawing, at their interface or junction, which is located upstream from the intermediate inlet 32, and preferably approximately adjacent thereto on the upstream side.

The shaft 38 of screw 36 is provided with one or more helical screw flights 56 thereon extending downstream from the radial extending shoulder 54 having a pitch for advancing molding compound or stock in a downstream direction towards the outlet 42 of barrel 34. Shaft 38 of screw 36 is also provided with one or more helical screw flights 58 thereon extending upstream from the location of the radial extending shoulder 54 having an opposite pitch for advancing molding compound or stock in an upstream direction towards the vent port and surplus discharge outlet 46.

Elongated screw shaft 38 can be provided with an internal central bore 60 axially extending through the length thereof to enable the continuous feeding and passage therethrough of an elongated conductor or wire for the continuous extrusion coating or molding thereabout of a plastic covering or insulation.

The multi-stage extruder apparatus of this invention accordingly provides for an improved method of extrusion and operation which eliminates one of the most serious problems encountered with this type of extrusion apparatus and process. Specifically, plastic molding compound or stock material is advanced continuously through the preceding or first extruder unit 12, propelled therethrough from inlet to outlet by the screw 18 therein, and in turn is continuously fed into the succeeding or second extruder unit 14 through the inlet 32 therein. On entering the succeeding unit 14, the continuously fed molding compound or stock is advanced continuously therethrough from the inlet to the outlet propelled by the downstream pitched flight 56 of the screw 36 along the length of the reduced intermediate portion 48 and the enlarged downstream portion 50 of shaft 38.

However, upon the occurrence of any imbalance of flow wherein the rotating screw of preceding unit 12 feeds or advances a flow of compound or stock to the succeeding unit 14 at a rate or volume greater than the rotating screw thereof can move it therethrough, whereby some excess or overfeed material or stock is forced upstream from the inlet in a direction counter to the normal flow path of the constantly advancing stream of material or stock and into the static environment of the unoccupied area provided for degassing, the thus displaced molding material or stock is thereupon effectively conveyed away, propelled by the upstream pitched flight 58, and discharged from the unit out the gas vent port and surplus discharge outlet 46. Accordingly, any molding compound or stock achieving a different heat history by departing from the normal flow pattern is precluded from rejoining the main stream of compound or stock and impairing its physical characteristics.

It should be understood that the extruder screw 36 of this invention can be constructed from a single body or mass of metal, such as by machining the entire shaft 38 with its several portions of different cross-section or diameter, including portions 48, 50, and 52, from a continuous unit or cylinder of metal. Moreover, the screw flights 56 and/or 58 can be provided on the shaft 38 by machining them from the same continuous unit of metal providing the machined contoured screw shaft, or they can be separately formed and attached on the screw shaft by welding or other appropriate means for their installation. On the other hand, extruder screw 36 of this invention, can be formed of a composite or assembly of components permanently or temporarily united together, such a shaft or cylinder of relatively small diameter with one or more sleeves telescoped thereon of apt dimensions and configurations to provide the changing cross-sections or diameters of the screw shaft forming the described portions 48, 50 and 52.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. An apparatus for the continuous blending and plasticizing of a heat softenable and curable molding compound comprising plasticizable polymeric material and continuously extrusion molding the blended and plasticized compound, comprising,
    (a) a preceding extruder unit comprising an extruder barrel having an upstream inlet and a downstream outlet, and containing therein a rotatable extruder screw;
    (b) a connection comprising a passage leading from the outlet of the barrel of the preceding extruder unit to an inlet in an intermediate portion of a succeeding extruder unit;
    (c) a succeeding extruder unit comprising an extruder barrel having an inlet positioned intermediate its upstream end and its downstream end and a downstream outlet, and containing therein a rotatable screw, said extruder barrel of the succeeding extruder unit having a surplus discharge outlet located upstream from its intermediate inlet; and
    (d) the rotatable screw of said succeeding extruder unit comprising a shaft extending from beyond the upstream end of the extruder barrel substantially through the length of said barrel towards the outlet and having a portion therein intermediate its length of substantially reduced cross-section located adjacent to the intermediate inlet of the succeeding extruder unit and extending downstream therefrom and an adjoining portion providing an enlarged cross-section extending upstream from said portion of reduced cross-section with an interface between the adjoining portions of reduced and enlarged cross-sections of the shaft forming a generally radial extending shoulder located upstream from said intermediate inlet, said shaft being provided with a helical screw flight extending downstream from the interface shoulder having a pitch to advance molding compound from the intermediate inlet downstream toward the outlet, and a helical screw flight extending upstream from the interface shoulder having an opposite pitch to advance surplus molding compound upstream toward the surplus discharge outlet.

2. An apparatus for the continuous blending and plasticizing of a heat softenable and curable molding compound comprising plasticizable polymeric material and continuously extrusion molding the blended and plasticized compound, comprising:
    (a) a preceding extruder unit comprising an extruder barrel having an upstream inlet for the feeding of molding compound and a downstream outlet for its discharge therefrom, and containing therein a rotatable extruder screw for the continuous mixing and plasticizing and continuous progressive advancement of heat softenable molding compound therethrough and discharge from the barrel outlet;
    (b) a connection comprising a passage leading from the outlet of the barrel of the preceding extruder unit to an inlet in an intermediate portion of a succeeding extruder unit for the transfer of progressively advancing molding compound from the outlet of the preceding unit into the inlet of the succeeding unit;
    (c) a succeeding extruder unit comprising an extruder barrel having an inlet for feeding molding compound positioned intermediate its upstream end and its downstream end and a downstream outlet, and containing therein a rotatable screw for the continuous mixing and plasticizing and continuous progressive advancement of heat softenable molding compound from the intermediate inlet through to and out the downstream outlet, said extruder barrel of the succeeding extruder unit having a surplus discharge outlet located upstream from its intermediate inlet for disposal of displaced molding compound moving upstream from the inlet; and
    (d) the rotatable screw of said succeeding extruder unit comprising a shaft extending from beyond the upstream end of the extruder barrel substantially through the length of said barrel towards the outlet and having a portion therein intermediate its length of substantially reduced cross-section located adjacent to the intermediate inlet of the succeeding extruder unit and extending downstream therefrom and an adjoining portion of enlarged cross-section extending upstream from said portion of reduced cross-section with an interface between the adjoining portions of reduced and enlarged cross-sections of the shaft forming a generally radial extending shoulder located upstream from said intermediate inlet to impede movement of molding compound upstream, said shaft being provided with a helical screw flight extending downstream from the interface shoulder having a pitch to advance molding compound from the intermediate inlet downstream toward the outlet, and a helical screw flight extending upstream from the interface shoulder having an opposite pitch to advance surplus molding compound upstream toward the surplus discharge outlet.

3. The apparatus of claim 2, wherein the downstream outlet of the barrel of the succeeding extruder unit leads to a shaping die.

4. The apparatus of claim 2, wherein said interface radial extending shoulder between the portions of reduced and enlarged cross-sections of the shaft is located immediately upstream of the imtermediate inlet in the barrel of the succeeding extruder unit.

5. The apparatus of claim 2, wherein the downstream outlet of the barrel of the succeeding extruder unit leads to a shaping die for the continuous forming of an insulating covering of molding compound around an elongated conductor.

6. The apparatus of claim 2, wherein the shaft of the rotatable screw of the succeeding extruder unit has an interior central bore extending the axial length thereof for the passage of an elongated conductor to be covered with molding compound.

7. An apparatus for the continuous blending and plasticizing of a heat softenable and curable molding compound comprising plasticizable polymeric material and continuously extrusion molding the blended and plasticized compound comprising:

(a) a preceding extruder unit comprising an extruder barrel having an upstream inlet for the feeding of molding compound and a downstream outlet for its discharge therefrom, and containing therein a rotatable extruder screw for the continuous mixing and plasticizing and continuous progressive advancement of heat softenable molding compound therethrough and discharge from the barrel outlet;

(b) a connection comprising a passage leading from the outlet of the barrel of the preceding extruder unit to an inlet in an intermediate portion of a succeeding extruder unit for the transfer of progressively advancing molding compound for the outlet of the preceding unit into the inlet of the succeeding unit;

(c) a succeeding extruder unit comprising an extruder barrel having an inlet for feeding molding compound positioned intermediate its upstream end and its downstream end and a downstream outlet leading to a shaping die, and containing therein a rotatable screw for the continuous mixing and plasticizing and continuous progressive advancement of heat softenable molding compound from the intermediate inlet through to and out the downstream outlet, said extruder barrel of the succeeding unit having a surplus discharge outlet located upstream from its intermediate inlet for disposal of displaced molding compound moving upstream from the inlet; and (d) the rotatable screw of said succeeding extruder unit comprising a shaft extending from beyond the upstream end of the extruder barrel substantially through the length of said barrel towards the outlet providing with an interior central bore extending the axial length thereof and having a portion therein intermediate its length of substantially reduced cross-section located adjacent to the intermediate inlet of the succeeding extruder unit and extending downstream therefrom and an adjoining portion of enlarged cross-section located immediately upstream of the intermediate inlet in the barrel and extending upstream from said portion of reduced cross-section with an interface between the adjoining portions of reduced and enlarged cross-sections of the shaft forming a generally radial extending shoulder located upstream from said intermediate inlet to impede movement of molding compound upstream, said shaft being provided with a helical screw flight extending downstream from the interface shoulder having a pitch to advance molding compound from the intermediate inlet downstream toward the outlet, and a helical screw flight extending upstream from the interface shoulder having an opposite pitch to advance surplus molding compound upstream toward the surplus discharge outlet.

* * * * *